(12) United States Patent
Rrumbullaku et al.

(10) Patent No.: US 10,961,768 B2
(45) Date of Patent: Mar. 30, 2021

(54) POWER DOOR CLOSING ALGORITHM

(71) Applicant: GM Global Technology Operations LLC, Detroit, MI (US)

(72) Inventors: Besi Rrumbullaku, Rochester, NY (US); Jeffrey L. Konchan, Romeo, MI (US); Eric Smith, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 266 days.

(21) Appl. No.: 16/149,795

(22) Filed: Oct. 2, 2018

(65) Prior Publication Data

US 2019/0376333 A1 Dec. 12, 2019

Related U.S. Application Data

(63) Continuation-in-part of application No. 16/006,141, filed on Jun. 12, 2018, now Pat. No. 10,704,315.

(51) Int. Cl.
*E05F 15/73* (2015.01)
*E05F 15/659* (2015.01)
(Continued)

(52) U.S. Cl.
CPC .............. *E05F 15/73* (2015.01); *B60J 5/00* (2013.01); *B60J 5/047* (2013.01); *E05F 15/40* (2015.01); *E05F 15/659* (2015.01); *E05F 2015/434* (2015.01); *E05Y 2400/45* (2013.01); *E05Y 2400/54* (2013.01); *E05Y 2400/81* (2013.01);
(Continued)

(58) Field of Classification Search
CPC ......... E05F 15/73; E05F 15/40; E05F 15/659; E05F 2015/434; B60J 5/047; B60J 5/00; E05Y 2900/536; E05Y 2900/531; E05Y 2400/81; E05Y 2400/852; E05Y 2400/54;
(Continued)

(56) References Cited

U.S. PATENT DOCUMENTS 5,982,126 A * 11/1999 Hellinga et al. ...........................
E05Y 2900/548
318/468
6,525,499 B2 * 2/2003 Naganuma ........... H02H 7/0851
318/445

(Continued)

OTHER PUBLICATIONS

Door Edge Protector, https://www.ford.ie/shop/explore/technology/comfort-and-convenience/door-edge-protector.

*Primary Examiner* — Dale W Hilgendorf

(57) ABSTRACT

A system for operating an automatically movable panel that forms a portion of an exterior of a vehicle, and provides access to an interior of the vehicle; a motivator connected to the panel and moving the panel through a range of motion; a proximity sensor; and a control module disposed within the motor vehicle, the control module having a processor configured to execute control logic, the motivator and the proximity sensor in electronic communication with the control module. The control logic including: determining a position of the panel; receiving a plurality of passive inputs; selectively utilizing the motivator to move the panel through the range of motion based on the passive inputs; utilizing the proximity sensor to selectively determine when to initiate movement of the movable panel through the range of motion with the motivator; and informing a motor vehicle occupant of movement of the panel via a human-machine interface.

17 Claims, 3 Drawing Sheets

(51) Int. Cl.
  *B60J 5/00*   (2006.01)
  *B60J 5/04*   (2006.01)
  *E05F 15/40*  (2015.01)
  *E05F 15/43*  (2015.01)

(52) U.S. Cl.
  CPC ... *E05Y 2400/852* (2013.01); *E05Y 2900/531* (2013.01); *E05Y 2900/536* (2013.01); *E05Y 2900/546* (2013.01); *E05Y 2900/548* (2013.01)

(58) Field of Classification Search
  CPC .......... E05Y 2900/548; E05Y 2400/45; E05Y 290/546
  See application file for complete search history.

(56) References Cited

U.S. PATENT DOCUMENTS

| | | |
|---|---|---|
| 9,797,181 B2 | 10/2017 | Wheeler et al. |
| 2003/0030299 A1* | 2/2003 | Cleland et al. ... E05Y 2900/548 296/146.8 |
| 2009/0030579 A1* | 1/2009 | Takehisa .......... E05Y 2900/546 701/49 |
| 2013/0292955 A1* | 11/2013 | Higgins et al. ......... E05F 15/40 292/195 |
| 2015/0283886 A1* | 10/2015 | Nania .................... E05F 15/73 296/146.4 |
| 2016/0208537 A1* | 7/2016 | Senguttuvan .......... E05F 15/73 |
| 2017/0044816 A1* | 2/2017 | Salter et al. ............ E05F 15/73 |
| 2017/0058588 A1* | 3/2017 | Wheeler et al. ........ B60J 5/047 |
| 2017/0218678 A1* | 8/2017 | Kothari .................. E05F 15/73 |
| 2017/0268280 A1* | 9/2017 | Kim ........................ E05F 15/73 |
| 2018/0030764 A1* | 2/2018 | Shaw et al. ............. E05F 15/40 |
| 2018/0038148 A1 | 2/2018 | Wheeler et al. |

\* cited by examiner

POWER DOOR CLOSING ALGORITHM

CROSS REFERENCE TO RELATED APPLICATIONS

This application claims the benefit of U.S. application Ser. No. 16/006,141 filed on Jun. 12, 2018, and now pending, the entire disclosure of which is incorporated herein by reference.

INTRODUCTION

The statements in this section merely provide background information relating to the present disclosure, and may not constitute prior art.

The present disclosure relates to obstacle detection with respect to the position of movable panels, and more specifically to movable panels of motor vehicles. The rate at which automation is being adopted in motor vehicles has been accelerating in recent years, and the trend seems likely to continue. Automotive manufacturers have increasingly been producing vehicles with automated driving systems, as well as a variety of other user effort-reduction systems such as automatically actuated movable panels. In particular, more and more vehicles are being equipped with automatically actuated doors, trunk lids, hatches, hoods, and the like. However, automatically actuated movable panels also present a challenge, as without a person to control the movement of the movable panels, there is a potential for the panels to hit obstacles in their path, or to remain open at inopportune times. To avoid damage to automatically actuated movable door panels, trunk lids, hatches, hoods, and the like, as well as to avoid injury to pedestrians and vehicle occupants the automatically actuated movable panels can be closed by physically initializing movement of the automatically actuated door panels by utilizing a switch or by manually closing the door panels. However, requiring a user to utilize a physical switch or to manually close the movable panels places physical and mental demands on the user, and may place the user into stressful situations. Accordingly, there is a need in the art for new and improved methods for initializing actuation of automatically actuated movable panels of a motor vehicle that decrease the mental and physical burden on users while improving safety and maintaining or decreasing cost.

SUMMARY

According to several aspects a system for operating an automatically movable panel of a motor vehicle includes: a movable panel forming a portion of an exterior of the motor vehicle, and providing access to and from an interior compartment of the motor vehicle, a motivator physically connected to the movable panel and operable to move the movable panel through a first range of motion, a proximity sensor, and a control module disposed within the motor vehicle, the control module having a processor configured to execute control logic stored within a non transitory computer readable memory and a plurality of input/output ports, the motivator and the proximity sensor in electronic communication with the input/output ports of the control module. The control logic includes: a first control logic determining a position of the movable panel; a second control logic receiving a plurality of passive inputs; a third control logic selectively utilizing the motivator to move the movable panel through the first range of motion based on the plurality of passive inputs; a fourth control logic utilizing the proximity sensor to selectively determine when to initiate movement of the movable panel through the first range of motion with the motivator; and a fifth control logic informing a motor vehicle user of movement of the movable panel via a human-machine interface (HMI).

In another aspect of the present disclosure the proximity sensor further includes a radar sensor, an ultrasonic sensor, a LiDAR sensor, a resistive sensor, and a capacitive sensor.

In yet another aspect of the present disclosure the first control logic determines the position of the movable panel based on a movable panel latch position, the second control logic receives a position of a transmission ratio selector position, a position of a brake pedal, a vehicle speed, and a status of a seat belt buckle.

In yet another aspect of the present disclosure the control module further includes a body control module (BCM) in communication with a side access module (SAM), the SAM.

In yet another aspect of the present disclosure the third control logic further includes commanding the SAM to begin a powered movement event for the movable panel.

In yet another aspect of the present disclosure the third control logic further includes commanding the SAM to begin powered movement of the movable panel from an open position to a closed position when the movable panel is in an open position, the transmission ratio selector is moved out of a park position, the brake pedal is in a released position, the vehicle speed is greater than zero, and an occupant of the motor vehicle buckles a seat belt.

In yet another aspect of the present disclosure the third control logic further includes commanding the SAM to begin powered movement of the movable panel from a closed position to an open position when the movable panel is in a closed position, the transmission ratio selector is moved into a park position, the brake pedal is in a depressed position, the vehicle speed is approximately zero, and an occupant of the motor vehicle unbuckles the seat belt.

In yet another aspect of the present disclosure the fourth control logic further includes utilizing the proximity sensor to determine whether an obstacle is present within the first range of motion, and selectively preventing a powered movement event for the movable panel if an obstacle is present.

In yet another aspect of the present disclosure the fifth control logic further comprises presenting on the HMI a notification for an occupant of the motor vehicle, the notification informing the motor vehicle user of an in-process powered movement event for the movable panel.

In yet another aspect of the present disclosure the notification further comprises a cancellation option allowing the user of the motor vehicle to selectively cancel the in-process powered movement event.

In yet another aspect of the present disclosure when the occupant of the motor vehicle selectively cancels the in-process powered movement event the control module executes a sixth control logic continuously notifying the occupant of the motor vehicle of a movable panel position when the movable panel is in an open position.

In yet another aspect of the present disclosure a method for controlling operation of an automatically movable panel of a motor vehicle includes: determining a position of a movable panel of the motor vehicle, the movable panel forming a portion of an exterior of the motor vehicle, and providing access to and from an interior compartment of the motor vehicle; receiving by a control module disposed within the motor vehicle a plurality of passive inputs, the control module having a processor configured to execute control logic stored within a non transitory computer readable memory and a plurality of input/output ports, the plurality of input/output ports in electronic communication with a proximity sensor and a motivator, the motivator physically connected to the movable panel and operable to move the movable panel through a first range of motion. The method further includes selectively utilizing the motivator to move the movable panel through the first range of motion based on the plurality of passive inputs; selectively determining when to initiate movement of the movable panel through the first range of motion with the motivator based on outputs from the proximity sensor; and informing a motor vehicle occupant of movement of the movable panel via a human-machine interface (HMI).

In yet another aspect of the present disclosure the method for controlling operation of an automatically movable panel of a motor vehicle further includes: determining the position of the movable panel based on a movable panel latch position; and receiving within the control module a position of a transmission ratio selector, a position of a brake pedal, a vehicle speed, and a status of a seat belt buckle.

In yet another aspect of the present disclosure the method for controlling operation of an automatically movable panel of a motor vehicle wherein the proximity sensor further comprises a radar sensor, an ultrasonic sensor, a LiDAR sensor, a resistive sensor, and a capacitive sensor.

In yet another aspect of the present disclosure the method for controlling operation of an automatically movable panel of a motor vehicle wherein the control module further comprises a body control module (BCM) in communication with a side access module (SAM), the SAM managing the position of the movable panel.

In yet another aspect of the present disclosure the method for controlling operation of an automatically movable panel of a motor vehicle further includes: commanding the SAM to begin a powered movement event for the movable panel.

In yet another aspect of the present disclosure the method for controlling operation of an automatically movable panel of a motor vehicle further includes commanding the SAM to begin powered movement of the movable panel from an open position to a closed position when the movable panel is in an open position, the transmission ratio selector is moved out of a park position, the brake pedal is in a released position, the vehicle speed is greater than zero, and an occupant of the motor vehicle buckles the seat belt buckle, and commanding the SAM to begin powered movement of the movable panel from a closed position to an open position when the movable panel is in a closed position, the transmission ratio selector is moved into a park position, the brake pedal is in a depressed position, the vehicle speed is approximately zero, and an occupant of the motor vehicle unbuckles the seat belt buckle.

In yet another aspect of the present disclosure the method for controlling operation of an automatically movable panel of a motor vehicle further includes: determining whether an obstacle is present within the first range of motion utilizing the proximity sensor, and selectively preventing a powered movement event for the movable panel if an obstacle is present.

In yet another aspect of the present disclosure the method for controlling operation of an automatically movable panel of a motor vehicle further includes: presenting on the HMI a notification for the motor vehicle occupant, the notification informing the motor vehicle occupant of an in-process powered movement event for the movable panel; presenting a cancellation option allowing the occupant of the motor vehicle to selectively cancel the in-process powered movement event; and continuously notifying the occupant of the motor vehicle of the movable panel position when the movable panel is in an open position.

In yet another aspect of the present disclosure a method for controlling operation of an automatically movable panel of a motor vehicle includes: determining a position of a movable panel of the motor vehicle based on a movable panel latch position, the movable panel forming a portion of an exterior of the motor vehicle, and providing access to and from an interior compartment of the motor vehicle; receiving by a body control module (BCM) disposed within the motor vehicle a plurality of passive inputs including a position of a transmission ratio selector, a position of a brake pedal, a vehicle speed, and a status of a seat belt buckle, the BCM having a processor configured to execute control logic stored within a non transitory computer readable memory and a plurality of input/output ports, the plurality of input/output ports in electronic communication with a proximity sensor and a motivator, the proximity sensor includes a radar sensor, an ultrasonic sensor, a LiDAR sensor, a resistive sensor, or a capacitive sensor, and the motivator physically connected to the movable panel and operable to move the movable panel through a first range of motion. The method further includes selectively commanding a side access module (SAM) to utilize the motivator to move the movable panel through the first range of motion based on the plurality of passive inputs; selectively determining when to begin a powered movement event for the movable panel through the first range of motion with the motivator based on outputs from the proximity sensor; and determining whether an obstacle is present within the first range of motion utilizing the proximity sensor, and selectively preventing a powered movement event for the movable panel if an obstacle is present. The method further includes commanding the SAM to begin powered movement of the movable panel from an open position to a closed position when the movable panel is in an open position, the transmission ratio selector is moved out of a park position, the brake pedal is in a released position, the vehicle speed is greater than zero, and an occupant of the motor vehicle buckles a seat belt buckle, and commanding the SAM to begin powered movement of the movable panel from a closed position to an open position when the movable panel is in a closed position, the transmission ratio selector is moved into a park position, the brake pedal is in a depressed position, the vehicle speed is approximately zero, and an occupant of the motor vehicle unbuckles a seat belt buckle. The method further includes presenting on a human machine interface (HMI) a notification for the motor vehicle occupant, the notification informing the motor vehicle occupant of an in-process powered movement event for the movable panel; presenting a cancellation option allowing the occupant of the motor vehicle to selectively cancel the in-process powered movement event; and continuously notifying the occupant of the motor vehicle of the movable panel position when the movable panel is in an open position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
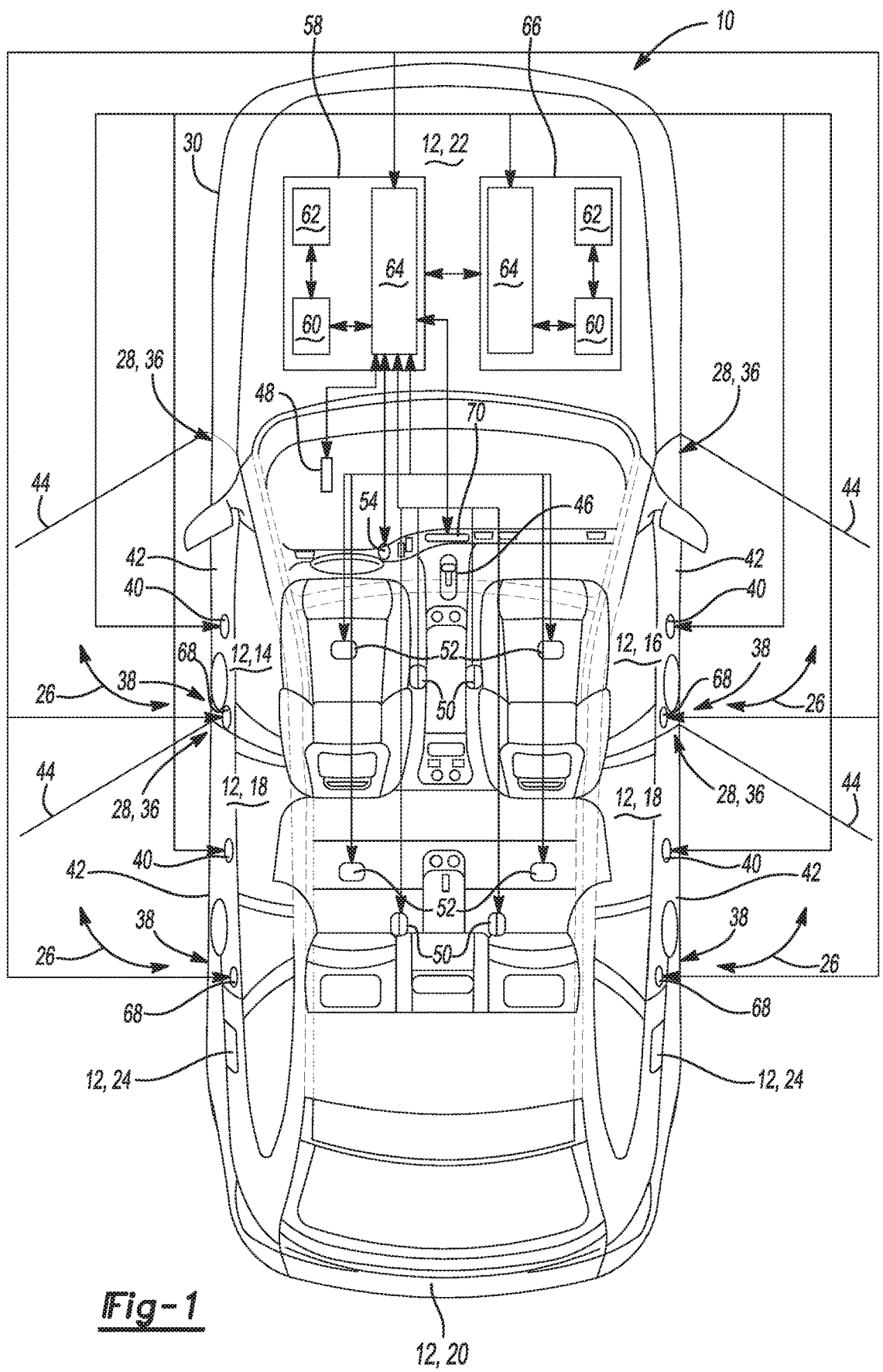
FIG. 1 is a view of a motor vehicle equipped with proximity sensors according to an aspect of the present disclosure.

Reference will now be made in detail to several embodiments of the disclosure that are illustrated in accompanying drawings. Whenever possible, the same or similar reference numerals are used in the drawings and the description to refer to the same or like parts or steps. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The term "computer", "controller", or "module" as used herein generally includes any electronic control device having a preprogrammed digital computer or processor, memory or non-transitory computer readable medium used to store data such as control logic, software applications, instructions, computer code, software, or applications, data, lookup tables, etc., and a transceiver (or input/output ports). Computer readable medium includes any type of medium capable of being accessed by a computer, such as read only memory (ROM), random access memory (RAM), a hard disk drive, a compact disc (CD), a digital versatile disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor is configured to execute the code or instructions. In some examples, the computer or server also includes a dedicated Wi-Fi controller configured to wirelessly communicate with wireless communications hotspots using Wi-Fi protocols under IEEE 802.1X.

The computer or server further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory or in additional or separate memory. Examples of the applications include audio or video streaming services, games, browsers, social media, network management systems, directory access and management systems, and the like, without departing from the scope or intent of the present disclosure.

The following description is merely exemplary in nature and is not intended to limit the present disclosure, application, or uses.

Referring to FIG. 1, a motor vehicle is shown and indicated generally by reference number 10. While the motor vehicle 10 is depicted as a car, it should be understood that the motor vehicle 10 may be a car, including but not limited to a coupe, a sedan, a hatchback, or an estate; or a truck, an SUV, a van, a semi, a tractor, a bus, or any other such motor vehicle 10 without departing from the scope or intent of the present disclosure. The motor vehicle 10 is equipped with at least one movable panel 12 providing access to and from an interior compartment (not specifically shown) of the motor vehicle 10. In several aspects, the interior compartment of the motor vehicle 10 is a trunk, an engine compartment, a passenger compartment, or the like. In several aspects, the motor vehicle 10 may have any number of movable panels 12, such as a driver door 14, a passenger door 16, rear passenger doors 18, a trunk 20, a rear hatch or liftgate (not specifically shown), a hood or bonnet 22, a fuel door 24, or any other such movable panel 12.

Each movable panel 12 articulates through a first range of motion 26 via a hinged connection 28 to the body 30 of the motor vehicle 10. In several aspects, the hinged connection 28 includes a hinge pin (not specifically shown) inserted through hinge pin receivers (not specifically shown) in the movable panel 12 and the body 30 of the motor vehicle 10. However, depending on the particular movable panel 12, and on design constraints, the hinged connection 28 may take any of a variety of forms including a goose neck hinge, a scissors hinge, an offset hinge, a damped hinge, or the like. In the example of FIG. 1, the hinged connections 28 of the driver door 14, passenger door 16, and rear passenger doors 18 are disposed toward a door front end 36 of each of the motor vehicle doors 14, 16, 18. Thus each of the motor vehicle doors 14, 16, 18 articulate horizontally outward through the first range of motion 26. It should be understood, however, that in other examples, the hinged connection 28 for a given movable panel 12 may allow each movable panel 12 to articulate in any of a variety of different directions without departing from the scope or intent of the present disclosure. For example, in some motor vehicles 10 the hinged connection 28 allows the movable panel 12 to articulate vertically in a gullwing, scissors, or butterfly fashion. In another example, in some other motor vehicles 10 the hinged connection 28 allows the movable panel to articulate horizontally in a swan motion, or in a so-called "suicide" motion where the motor vehicle doors 14, 16, 18 have hinged connections 28 disposed at a door rear end 38. In other examples, the hinged connection 28 allows the movable panel 12 to articulate in a combination of vertical and horizontal movements such as in a movable panel 12 with dihedral synchro-helical actuation. In still other examples, the hinged connection 28 may be better described as a sliding connection (not specifically shown) where the movable panel 12 is mounted to or suspended from a track and opens by sliding horizontally or alongside or into the motor vehicle 10. In some aspects, the sliding connection may be vertically oriented so that the movable panel retracts into a roof or floor (not specifically shown) of the motor vehicle 10.

In several aspects, the movable panels 12 are actuated automatically. That is, at least one of the movable panels 12 can be actuated without being physically manipulated by a person. Motivation for the automatic actuation of the movable panel or panels 12 is provided by a solenoid, a linear actuator, a spring and damper, a cable and reel mechanism, an electric motor, a hydraulic or pneumatic system, or other such door drive mechanisms or motivators (not specifically shown). The motivators may be disposed on the movable panel 12, on an internal aspect of the body 30 of the motor vehicle 10, within the hinged connection 28, or the like. In some examples, the motivators actuate the movable panel 12 via a cable mechanism (not specifically shown).

The movable panel or panels 12 are used in conjunction with at least one obstacle detection or proximity sensor 40. In several aspects, the proximity sensor 40 is a radar sensor, an ultrasonic sensor, a camera, a LiDAR sensor, a non-contact capacitive sensor, a resistive sensor, such as a pinch strip sensor, or any other such proximity sensor 40. In some examples, multiple proximity sensors 40 may be used with one or more of the movable panels 12. That is, multiple proximity sensors 40 may be mounted to a variety of locations on or around one or more of the movable panels 12. Moreover, the multiple proximity sensors 40 may be all of the same type (e.g. all ultrasonic sensors), or the multiple proximity sensors 40 may be of a variety of different types (e.g. ultrasonic and resistive pinch strip sensors). In one aspect, an ultrasonic sensor and a resistive pinch strip are used in conjunction with a single movable panel 12 to detect ultrasonic data as well as physical interference data. In some examples, and as described in significant detail in U.S. Pat. No. 10,704,315 B2, the proximity sensors 40 are mounted to an articulating mount (not specifically shown). Depending on the particular application, the articulating mount may take any of a variety of different forms. However, while as described in U.S. Pat. No. 10,704,315 B2 some or all of the proximity sensors 40 may be mounted on an articulating mount, it should be appreciated that likewise some or all of the proximity sensors 40 may be mounted directly to the movable panel 12 or to the body 30 without being disposed on an articulating mount at all without departing from the scope or intent of the present disclosure.

Figure 2:
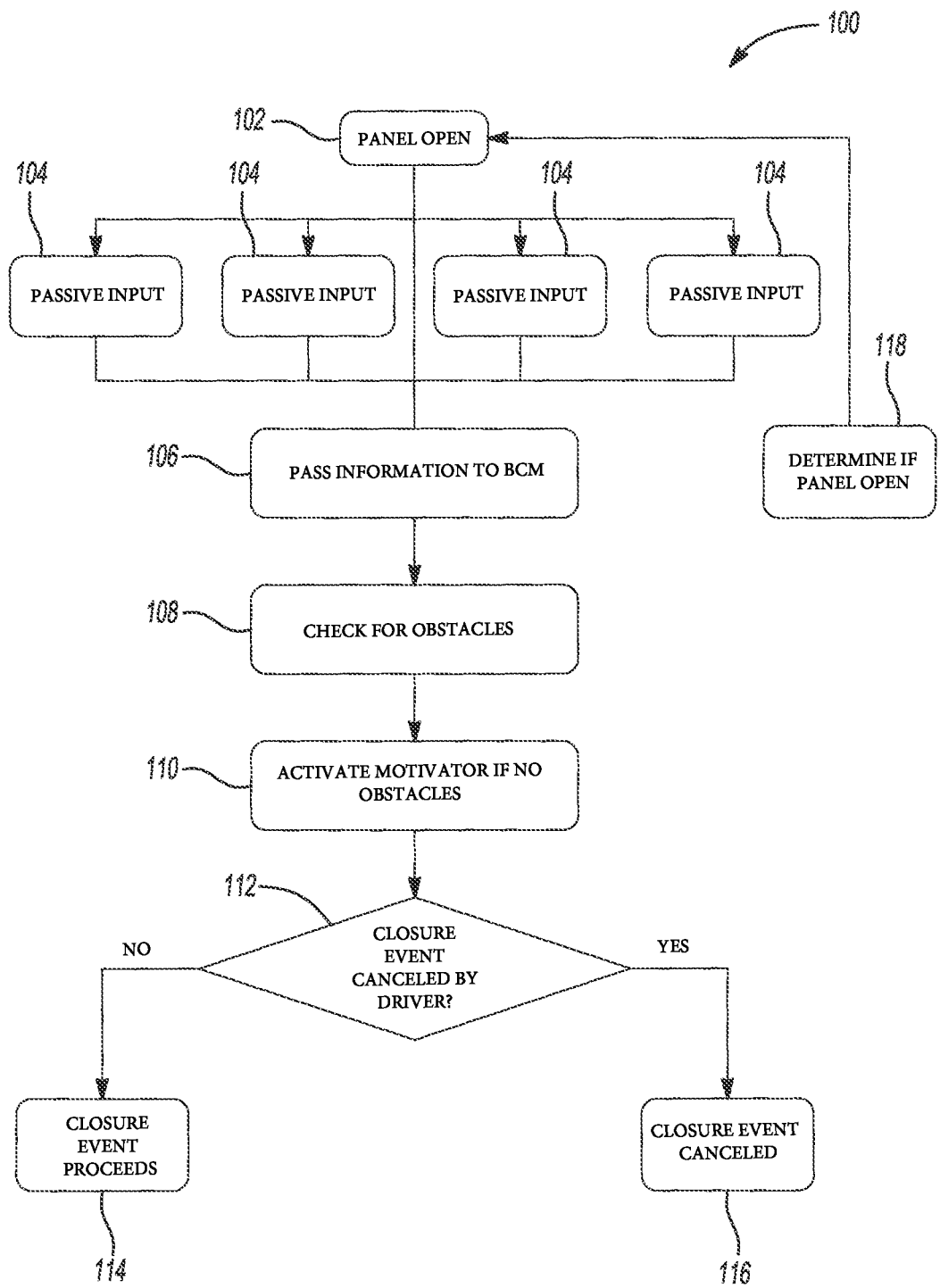
FIG. 2 is a flow diagram of an algorithm for a method of operation for a power door closing mechanism according to an aspect of the present disclosure.

Turning now to FIG. 2, and with continuing reference to FIG. 1 a method for using the automatically actuated movable panels 12 of the present disclosure is shown and generally indicated by reference number 100. At block 102 at least one movable panel 12 of the motor vehicle 10 is left in the open position 44. At blocks 104 a variety of passive inputs from the user or occupant are used in combination by the automatically actuated movable panel 12 to determine whether the movable panel 12 should remain in the open position 44 or instead, be moved to the closed position 42. Passive inputs from the user include inputs from a variety of on-board systems of the motor vehicle 10. In one aspect, the passive input includes movement of a transmission ratio selector 46 from a "Park" to an non-"Park" position, such as moving the transmission ratio selector 46 from "Park" or "Neutral" to "Drive" or "Reverse". In another aspect, the passive input is the release of a braking system or brake pedal 48 such as the driver of the motor vehicle 10 removing her foot from the brake pedal or the release of an emergency brake. In another aspect, the passive input includes a vehicle rate of travel or speed. When the motor vehicle 10 is in motion, it may be hazardous to occupants of the motor vehicle 10 to have various movable panels 12 throughout the car remaining in the open position 44. This is especially true at high rates of speed. In some aspects, the passive inputs include speeds above a predetermined threshold speed, such as about 3 kilometers per hour when the transmission ratio selector 46 is not in a neutral position, that is for example, when the transmission ratio selector 46 is in "Drive", "Reverse", or a "Manual" mode. The passive inputs may also include a seat belt position, as sensed by a seat belt buckle sensor 50, or a seat use sensor 52, such as a galvanic sensor or a weight sensor within a seat of the motor vehicle 10 and indicating the presence or absence of a person in a given seat within the motor vehicle 10. The passive inputs may also include user inputs such as the pressing of an "ENGINE START" button 54 or the turning of a key in the ignition of the motor vehicle 10 to crank the motor vehicle's 10 engine or start the engine. While in the foregoing description, the passive inputs have variously been described as movement of a transmission ratio selector 46, release of a braking system 48, vehicle speed, seat belt buckle position, engine start, and the like, it should be appreciated that the passive inputs may encompass any of a variety of other user inputs without departing from the scope or intent of the present disclosure. Moreover, in several aspects, a combination of passive inputs of different types are used together to influence the position of a movable panel 12. Accordingly, the foregoing examples are intended to be merely illustrative, and non-limiting.

The motor vehicle 10 is equipped with at least one body control module (BCM) 58. The BCM 58 is an electronic control device having a preprogrammed digital computer or processor 60, memory 62 or non-transitory computer readable medium used to store data such as control logic, software applications, instructions, computer code, software, or applications, data, lookup tables, etc., and a transceiver (or input/output ports) 64. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code, software, or applications includes any type of program code, including source code, object code, and executable code. The processor 60 is configured to execute the code or instructions stored in the memory 62. In some examples, the BCM 58 also includes communication means such as a dedicated Wi-Fi controller configured to wirelessly communicate with wireless communications hotspots using Wi-Fi protocols under IEEE 802.1X.

The BCM 58 further includes one or more applications. An application is a software program configured to perform a specific function or set of functions. The application may include one or more computer programs, software components, sets of instructions, procedures, functions, objects, classes, instances, related data, or a portion thereof adapted for implementation in a suitable computer readable program code. The applications may be stored within the memory 62 or in additional or separate memory 62. Examples of the applications include audio or video streaming services, games, browsers, social media, network management systems, directory access and management systems, motor vehicle 10 movable panel 12 actuation management systems and the like, without departing from the scope or intent of the present disclosure. The BCM 58 of some examples is complemented by a side access module (SAM) 66. The SAM 66 uses the proximity sensors 40 to determine the presence or absence of an obstacle and/or the presence or absence of a user of the motor vehicle 10. The SAM 66, like the BCM 58 includes a processor 60, a memory 62, and a plurality of input/output peripherals or ports 64 in communication with the proximity sensors 40 and the BCM 58.

Referring once more to method 100, once the passive inputs have been received by the movable panel 12, and more specifically, by the SAM 66, at block 106 the SAM 66 passes the information gleaned from the various sensors, door latch position sensors or lock position sensors 68 and other apparatuses generating the passive input information to the BCM 58. In some aspects, the passive input information also includes a status of the automatically actuated movable panel 12 or door. That is, the passive input information also includes a position of the movable panel 12, such as a signal from a door latch or lock position sensor 68 indicating that the movable panel 12 is in the closed position 42 or the open position 44. Furthermore, at block 106, having received a door open status from the door latch sensor, in combination with a movement of a transmission ratio selector 46 and/or a seatbelt buckle sensor 50 indication, the BCM 58 sends a command to the SAM 66 to begin the powered closing of the opened door or movable panel 12 via the motivators.

At block 108, the SAM 66 checks for the presence of obstacles, or users which might physically interfere with or impede the movement of the movable panel 12. In some examples in which the motor vehicle 10 is equipped with non-contact proximity sensors 40, such as a radar sensor, an ultrasonic sensor, a camera, a LiDAR sensor, a non-contact capacitive sensor as described herein above, the SAM 66 checks for the presence of obstacles or users prior to initiating a movable panel 12 movement event. In several aspects, the movement event is a closure event when the movable panel 12 starts in the open position 44, and the movement event is an opening event when the movable panel 12 starts in the closed position 42. In other examples, in which the motor vehicle 10 is equipped only with contact-type sensors such as a resistive sensor, or a pinch strip sensor, or any other such proximity sensor 40, the SAM 66 checks for the presence of obstacles or users during the movement of the movable panel 12 during the closure event. In several aspects, the closure event is the movement of the movable panel 12 from the open position 44 to the closed position 42.

At block 110, having determined that no obstacles or users within the first range of motion 26 of the movable panel 12, the SAM 66 activates the motivator for the movable panel 12 and confirms motion of the movable panel 12 with the BCM 58. At block 110, the BCM 58 sends a prompt to the driver of the motor vehicle 10 via a human-machine interface (HMI) 70. In several aspects, the HMI 70 is a display screen mounted within a center console of the motor vehicle 10, or in a dashboard of the motor vehicle 10, or in an instrument binnacle of the motor vehicle 10, or in a heads-up display of the motor vehicle 10. In some examples, the HMI 70 is at least a portion of an infotainment system (not specifically shown) within the motor vehicle 10. In some examples, the HMI 70 may even be a wirelessly-connected driver-owned device, such as a cellular phone, a tablet, or other such device that is electronically paired with the motor vehicle 10. The prompt that is displayed on the motor vehicle 10 HMI 70 indicates that the movable panel 12 is closing, and provides the driver or other user of the motor vehicle 10 an option to cancel the closure event. That is, in several examples, the prompt displayed on the HMI 70 includes a notification such as, "a power door closing event is in process, hold to cancel command."

At block 112, the driver makes a closure event selection. In several aspects, the closure event selection includes either allowing the closure event to proceed or selecting the option to cancel the closure event. If at block 112, the driver does not indicate that he or she wishes to cancel the closure event, the method 100 proceeds to block 114 and the SAM 66 and/or BCM 58 initializes movement of the motivator and the closure event is allowed to proceed. On the other hand, if the driver decides to cancel the closure event, the method 100 proceeds to block 116 where the SAM 66 and/or BCM 58 does not initialize movement of the motivator and the closure event is cancelled. Moreover, if the closure event is cancelled, the BCM 58 continues to alert the drive or user of the motor vehicle 10 that a movable panel 12 is in the open position 44 by indicating the position of the movable panel 12 on the HMI 70, and/or by generating an audible "door ajar" notifications, such as a ringing bell, chime, verbal statement, or the like.

At block 118, the method 100 also assists the driver or user of the motor vehicle 10 in determining if a movable panel 12 has been left in the open position 44 after a state change of the transmission ratio selector 46 and/or seat belt buckle position. That is, if after the motor vehicle 10 has begun to move, if a movable panel 12 is opened on or after the transmission ratio selector 46 and/or seat belt buckle position has been determined, the method 100 proceeds to block 102 and the SAM 66 and BCM 58 are notified that the movable panel 12 or door has been put into the open (or partially open) position 44. The method 100 then proceeds through blocks 104-116 as described hereinabove.

Figure 3:
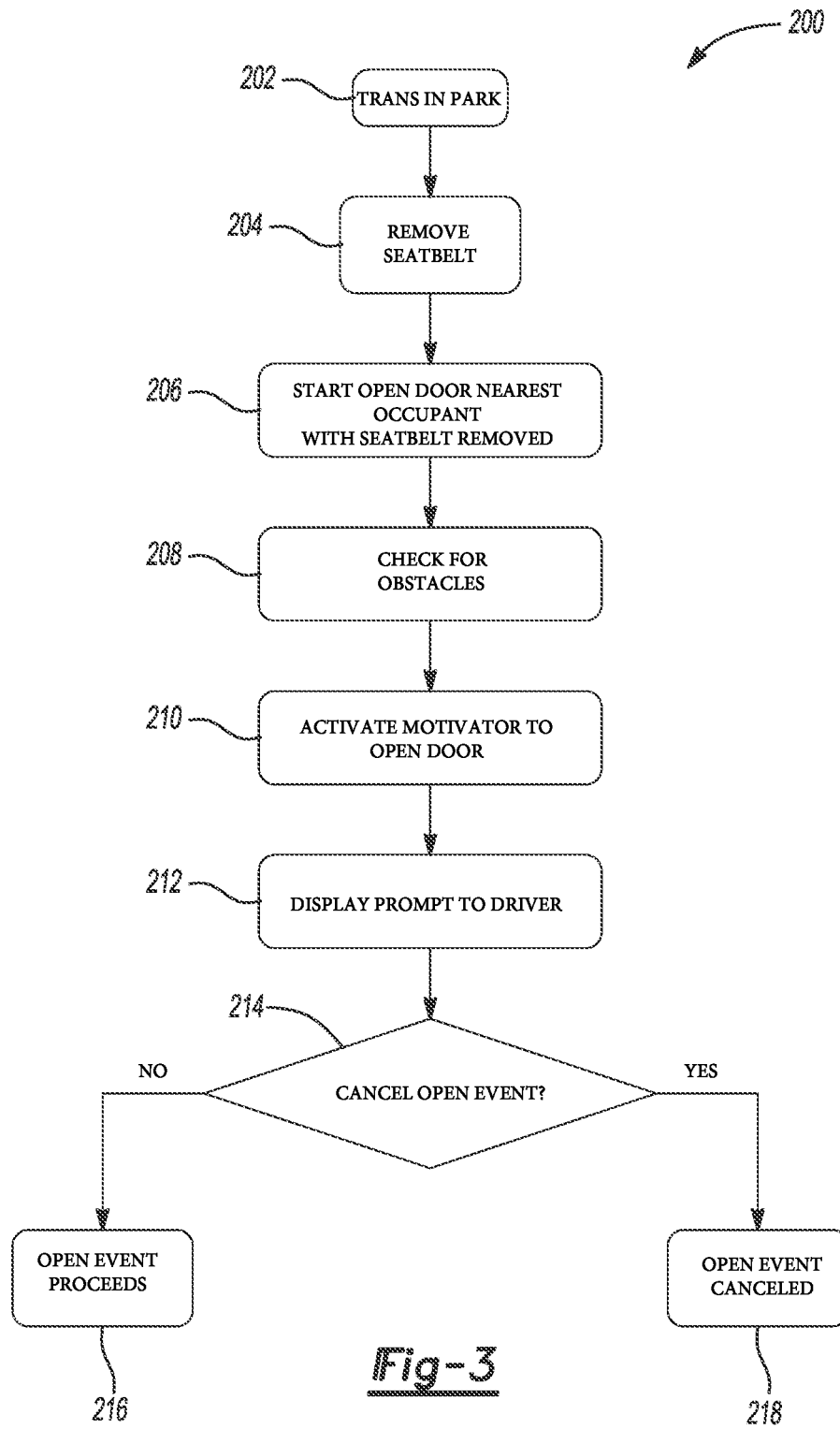
FIG. 3 is a flow diagram of an algorithm for a method of operation for a power door closing mechanism according to another aspect of the present disclosure.

Referring now to FIG. 3, and with continuing reference to FIGS. 1 and 2, a method for using the automatically actuated movable panels 12 of the present disclosure is shown and generally indicated by reference number 200. At block 202 the driver of the motor vehicle 10 uses the transmission ratio selector 46 to place the motor vehicle 10 transmission in the "Park" position. At block 204, at least one occupant of the motor vehicle 10 removes her seatbelt from the seatbelt buckle. The BCM 58 receives both the transmission ratio selector 46 position information and the seatbelt buckle position information, and at block 206, in several aspects the BCM 58 commands the SAM 66 to power open the movable panel 12 or door nearest to the occupant of the motor vehicle 10 who has removed her seatbelt. In several aspects, the BCM 58 only sends the command to the SAM 66 to power open the movable panel if the motor vehicle 10 transmission is in "Park" in order to limit the potential for the occupant who has removed her seatbelt from being able to step out of the motor vehicle 10 while the motor vehicle 10 is in motion. At block 208, the SAM 66 checks for the presence of obstacles within the first range of motion 26 prior to initiating a movable panel 12 open event. The movable panel 12 open event is the powered movement of the movable panel 12 from the closed position 42 to the open position 44 to facilitate user egress from the motor vehicle 10. At block 210, the SAM 66 activates the motivator to open the movable panel 12 and confirms motion of the movable panel 12 with the BCM 58. At block 212, the BCM 58 sends a prompt to the driver of the motor vehicle 10 via the HMI 70. The prompt that is displayed on the motor vehicle 10 HMI 70 indicates that the movable panel 12 is opening and provides the driver or other user of the motor vehicle 10 an option to cancel the open event. That is, in several examples, the prompt displayed on the HMI 70 includes a notification such as, "a power door open event is in process, hold to cancel command."

At block 214, the driver makes an open event selection. In several aspects, the open event selection includes either allowing the open event to proceed or selecting the option to cancel the open event. If at block 214, the driver does not indicate that he or she wishes to cancel the open event, the method 200 proceeds to block 216, the SAM 66 and/or BCM 58 initializes movement of the motivator and the open event is allowed to proceed. Moreover, if the open event is not cancelled, the BCM 58 continuously alerts the driver or user of the motor vehicle 10 that a movable panel 12 is in the open position 44 by indicating the position of the movable panel 12 on the HMI 70, and/or by generating an audible "door ajar" notifications, such as a ringing bell, chime, verbal statement, or the like. On the other hand, if the driver decides to cancel the open event, the method 200 proceeds to block 218 where the SAM 66 and/or BCM 58 does not initialize movement of the motivator and the open event is cancelled.

A power door closing algorithm of the present disclosure offers several advantages. These include the ability for automatically actuated movable panels 12 to avoid hitting obstacles, thereby reducing the potential for damage to automatically actuated door panels 12, trunk 20 lids, hatches, hoods 22 fuel doors 24, and the like. Moreover, because the power door closing algorithm of the present disclosure operates substantially automatically and on pre-existing physical and/or electronic hardware, the physical and mental demands on the driver or user of the motor vehicle 10 are reduced, while safety is improved, and production and development costs are maintained or reduced.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for operating an automatically movable panel of a motor vehicle comprising:
   a movable panel forming a portion of an exterior of the motor vehicle, and providing access to and from an interior compartment of the motor vehicle;
   a motivator physically connected to the movable panel and operable to move the movable panel through a first range of motion;
   a proximity sensor;
   a control module disposed within the motor vehicle, the control module having a processor configured to execute control logic stored within a non transitory computer readable memory and a plurality of input/output ports, the motivator and the proximity sensor in electronic communication with the input/output ports of the control module, the control logic comprising:
   a first control logic determining a position of the movable panel;
   a second control logic receiving a plurality of passive inputs;
   a third control logic selectively utilizing the motivator to move the movable panel through the first range of motion based on the plurality of passive inputs;
   a fourth control logic utilizing the proximity sensor to selectively determine when to initiate movement of the movable panel through the first range of motion with the motivator; and
   a fifth control logic informing a motor vehicle occupant of movement of the movable panel via a human-machine interface (HMI), wherein the fifth control logic further comprises presenting on the HMI a notification for the motor vehicle occupant informing the motor vehicle occupant of an in-process powered movement event for the movable panel, wherein the notification further comprises a cancellation option allowing the motor vehicle occupant to selectively cancel the in-process powered movement event.

2. The system for operating the automatically movable panel of the motor vehicle of claim 1 wherein the proximity sensor further comprises a radar sensor, an ultrasonic sensor, a LiDAR sensor, a resistive sensor, or a capacitive sensor.

3. The system for operating the automatically movable panel of the motor vehicle of claim 2 wherein the first control logic determines the position of the movable panel based on a movable panel latch position, the second control logic receives a position of a transmission ratio selector position, a position of a brake pedal, a vehicle speed, and a status of a seat belt buckle.

4. The system for operating the automatically movable panel of the motor vehicle of claim 3 wherein the control module further comprises a body control module (BCM) in communication with a side access module (SAM).

5. The system for operating the automatically movable panel of the motor vehicle of claim 4 wherein the third control logic further comprises commanding the SAM to begin a powered movement event for the movable panel.

6. The system for operating the automatically movable panel of the motor vehicle of claim 5 wherein the third control logic further comprises commanding the SAM to begin powered movement of the movable panel from an open position to a closed position when the movable panel is in the open position, the transmission ratio selector is moved out of a park position, the brake pedal is in a released position, the vehicle speed is greater than zero, and an occupant of the motor vehicle buckles a seat belt.

7. The system for operating the automatically movable panel of the motor vehicle of claim 5 wherein the third control logic further comprises commanding the SAM to begin powered movement of the movable panel from a closed position to an open position when the movable panel is in the closed position, the transmission ratio selector is moved into a park position, the brake pedal is in a depressed position, the vehicle speed is approximately zero, and an occupant of the motor vehicle unbuckles a seat belt.

8. The system for operating the automatically movable panel of the motor vehicle of claim 1 wherein the fourth control logic further comprises utilizing the proximity sensor to determine whether an obstacle is present within the first range of motion, and selectively preventing a powered movement event for the movable panel if the obstacle is present.

9. The system for operating the automatically movable panel of the motor vehicle of claim 1 wherein when the occupant of the motor vehicle selectively cancels the in-process powered movement event the control module executes a sixth control logic continuously notifying the occupant of the motor vehicle of the position of the movable panel when the movable panel is in an open position.

10. A method for controlling operation of an automatically movable panel of a motor vehicle comprising:
    determining a position of the movable panel of the motor vehicle, the movable panel forming a portion of an exterior of the motor vehicle, and providing access to and from an interior compartment of the motor vehicle;
    receiving by a control module disposed within the motor vehicle a plurality of passive inputs, the control module having a processor configured to execute control logic stored within a non-transitory computer readable memory and a plurality of input/output ports, the plurality of input/output ports in electronic communication with a proximity sensor and a motivator, the motivator physically connected to the movable panel and operable to move the movable panel through a first range of motion;
    selectively utilizing the motivator to move the movable panel through the first range of motion based on the plurality of passive inputs;
    selectively determining when to initiate movement of the movable panel through the first range of motion with the motivator based on outputs from the proximity sensor; and
    informing a motor vehicle occupant of movement of the movable panel via a human-machine interface (HMI);
    presenting on the HMI a notification for the motor vehicle occupant, the notification informing the motor vehicle occupant of an in-process powered movement event for the movable panel;
    presenting a cancellation option allowing the motor vehicle occupant to selectively cancel the in-process powered movement event; and
    continuously notifying the motor vehicle occupant of the movable panel position when the movable panel is in an open position.

11. The method for controlling operation of the automatically movable panel of the motor vehicle of claim 10 further comprising:
    determining the position of the movable panel based on a movable panel latch position; and
    receiving within the control module a position of a transmission ratio selector, a position of a brake pedal, a vehicle speed, and a status of a seat belt buckle.

12. The method for controlling operation of the automatically movable panel of the motor vehicle of claim 10 wherein the proximity sensor further comprises a radar sensor, an ultrasonic sensor, a LiDAR sensor, a resistive sensor, or a capacitive sensor.

13. The method for controlling operation of the automatically movable panel of the motor vehicle of claim 10 wherein the control module further comprises a body control module (BCM) in communication with a side access module (SAM), the SAM managing the position of the movable panel.

14. The method for controlling operation of the automatically movable panel of the motor vehicle of claim 13 further comprising:
    commanding the SAM to begin a powered movement event for the movable panel.

15. The method for controlling operation of the automatically movable panel of the motor vehicle of claim 13 further comprising commanding the SAM to begin powered movement of the movable panel from the open position to a closed position when the movable panel is in the open position, a transmission ratio selector is moved out of a park position, a brake pedal is in a released position, a vehicle speed is greater than zero, and the motor vehicle occupant buckles a seat belt buckle, and commanding the SAM to begin powered movement of the movable panel from the closed position to the open position when the movable panel is in the closed position, the transmission ratio selector is moved into the park position, the brake pedal is in a depressed position, the vehicle speed is approximately zero, and the motor vehicle occupant unbuckles the seat belt buckle.

16. The method for controlling operation of the automatically movable panel of the motor vehicle of claim 10 further comprising:
    determining whether an obstacle is present within the first range of motion utilizing the proximity sensor, and selectively preventing a powered movement event for the movable panel if the obstacle is present.

17. A method for controlling operation of an automatically movable panel of a motor vehicle comprising:
    determining a position of the movable panel of the motor vehicle based on a movable panel latch position, the movable panel forming a portion of an exterior of the motor vehicle, and providing access to and from an interior compartment of the motor vehicle;
    receiving by a body control module (BCM) disposed within the motor vehicle a plurality of passive inputs including a position of a transmission ratio selector, a position of a brake pedal, a vehicle speed, and a status of a seat belt buckle, the BCM having a processor configured to execute control logic stored within a non-transitory computer readable memory and a plurality of input/output ports, the plurality of input/output ports in electronic communication with a proximity sensor and a motivator, the proximity sensor comprising a radar sensor, an ultrasonic sensor, a LiDAR sensor, a resistive sensor, or a capacitive sensor, and the motivator physically connected to the movable panel and operable to move the movable panel through a first range of motion;

selectively commanding a side access module (SAM) to utilize the motivator to move the movable panel through the first range of motion based on the plurality of passive inputs;

selectively determining when to begin the powered movement event for the movable panel through the first range of motion with the motivator based on outputs from the proximity sensor;

determining whether an obstacle is present within the first range of motion utilizing the proximity sensor, and selectively preventing the powered movement event for the movable panel if the obstacle is present;

commanding the SAM to begin powered movement of the movable panel from an open position to a closed position when the movable panel is in the open position, the transmission ratio selector is moved out of a park position, the brake pedal is in a released position, the vehicle speed is greater than zero, and an occupant of the motor vehicle buckles the seat belt buckle, and commanding the SAM to begin powered movement of the movable panel from the closed position to the open position when the movable panel is in the closed position, the transmission ratio selector is moved into the park position, the brake pedal is in a depressed position, the vehicle speed is approximately zero, and the occupant of the motor vehicle unbuckles the seat belt buckle;

presenting on a human machine interface (HMI) a notification for the occupant of the motor vehicle, the notification informing the occupant of the motor vehicle of an in-process powered movement event for the movable panel;

presenting a cancellation option allowing the occupant of the motor vehicle to selectively cancel the in-process powered movement event; and continuously notifying the occupant of the motor vehicle of the movable panel position when the movable panel is in the open position.

* * * * *